(12) United States Patent
Diab (10) Patent No.: US 8,654,774 B2
(45) Date of Patent: *Feb. 18, 2014

(54) METHOD AND SYSTEM FOR ASYMMETRIC TRANSITION HANDSHAKE IN AN ENERGY EFFICIENT ETHERNET NETWORK

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/244,302

(22) Filed: Oct. 2, 2008

(65) Prior Publication Data

US 2009/0154467 A1  Jun. 18, 2009

Related U.S. Application Data

(60) Provisional application No. 61/014,202, filed on Dec. 17, 2007.

(51) Int. Cl.
*H04L 12/28* (2006.01)
(52) U.S. Cl.
USPC ........ 370/395.4; 370/235; 370/282; 370/465; 370/468; 370/473; 709/250
(58) Field of Classification Search
USPC ...................................... 370/395.4
See application file for complete search history.

(56) References Cited

U.S. PATENT DOCUMENTS

| | | | | |
|---|---|---|---|---|
| 5,854,658 A | * | 12/1998 | Uz et al. | 375/240.05 |
| 6,442,174 B1 | * | 8/2002 | Lin | 370/466 |
| 8,199,770 B2 | * | 6/2012 | Diab et al. | 370/465 |
| 2002/0044225 A1 | * | 4/2002 | Rakib | 348/734 |
| 2006/0034295 A1 | * | 2/2006 | Cherukuri et al. | 370/395.52 |
| 2006/0153238 A1 | * | 7/2006 | Bar-On et al. | 370/473 |
| 2006/0221831 A1 | * | 10/2006 | Wadekar et al. | 370/235 |
| 2007/0014575 A1 | * | 1/2007 | Kramer et al. | 398/71 |
| 2007/0280239 A1 | | 12/2007 | Lund | |
| 2008/0010661 A1 | * | 1/2008 | Kappler et al. | 725/120 |
| 2008/0050118 A1 | * | 2/2008 | Haran et al. | 398/63 |
| 2009/0028050 A1 | * | 1/2009 | Winter | 370/236 |
| 2009/0125735 A1 | | 5/2009 | Zimmerman | |

* cited by examiner

*Primary Examiner* — Ayaz Sheikh
*Assistant Examiner* — Hai-Chang Hsiung
(74) *Attorney, Agent, or Firm* — Farjami & Farjami LLP (57) ABSTRACT

Multi-rate link partners coupled via an Ethernet link may be configured to implement an asymmetric handshake wherein a change of rate in a first direction may be independent of delay that may occur when implementing a change of rate in a second direction. A rate change may be delayed based on a known time delay for configuring a link partner. A change in rate in the first direction may not be delayed by data transmissions in the second direction. Rate changes may be managed via physical layer control characters, physical layer out of band channel and/or packets generated from a layer above the physical layer. Control characters may be transmitted during inter-packet gaps and/or within a packet stream. Data rates may be transitioned from a full rate, intermediate rate or a rate of zero to a full data rate, intermediate rate or a rate of zero.

24 Claims, 6 Drawing Sheets

METHOD AND SYSTEM FOR ASYMMETRIC TRANSITION HANDSHAKE IN AN ENERGY EFFICIENT ETHERNET NETWORK

CROSS-REFERENCE TO RELATED APPLICATIONS/INCORPORATION BY REFERENCE

This application makes reference to, claims priority to, and claims the benefit of U.S. Provisional Application Ser. No. 61/014,202 filed on Dec. 17, 2007, entitled "method and system for asymmetric data rate transition handshake in an energy efficient network".

FIELD OF THE INVENTION

Certain embodiments of the invention relate to networking. More specifically, certain embodiments of the invention relate to a method and system for an asymmetric data rate transition handshake in an energy efficient Ethernet network.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a method and system for an asymmetric data rate transition handshake in an energy efficient Ethernet network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in method and system for an asymmetric data rate transition handshake in an energy efficient Ethernet network. In this regard, an Ethernet network may comprise multi-rate link partners that may be coupled via an Ethernet link. A first multi-rate link partner coupled via the Ethernet link, may be configured to implement a change of data rate for data communicated from the first multi-rate link partner to a second multi-rate link partner coupled via the Ethernet link. The configuration of the first multi-rate link partner may be accomplished independent of any delay that may occur when the second multi-rate link partner may implement a change of data rate for data communicated from the second multi-rate link partner to the first multi-rate link partner. In addition, a time instant for implementing changes of data rates may be determined based on known time delays for configuring the second multi-rate link partner to implement the data rate change. The change in data rate for data transmitted from the first link partner to the second link partner may not be delayed by transmissions generated by the second link partner. Data rate changes may be managed via one or more of a plurality of techniques, for example, physical layer control characters, physical layer out of band channel, other physical layer techniques or a combination of these techniques and packets generated from a layer above the physical layer.

In instances where physical layer control characters are utilized, the control characters may be transmitted during inter-packet gaps and/or within a packet stream. However, utilizing physical layer control characters and/or an out of band channel may be faster than utilizing packets generated from a higher layer protocol. In some embodiments of the invention, the first link partner and/or the second link partner may transmit data symmetrically, for example, they may transmit data at the same data rate in both directions even though link utilization may not be the same in both directions. This may be the case before and/or after implementation of a change in data rate. In other embodiments of the invention, the first link partner and the second link partner may transmit data asymmetrically, for example, they may transmit data at different data rates even when both link partners operate at full utilization. Again, this may be the case before and/or after implementation of the change in data rate. Accordingly, data rates for one or both link partners may be transitioned from one or more of a full data rate, an intermediate data rate and a data rate of zero to one or more of a full data rate, an intermediate data rate and a data rate of zero. In this manner, by adjusting data rates within a quicker transition time, Ethernet networks may be enabled to communicate in a more energy efficient manner.

Figure 1:
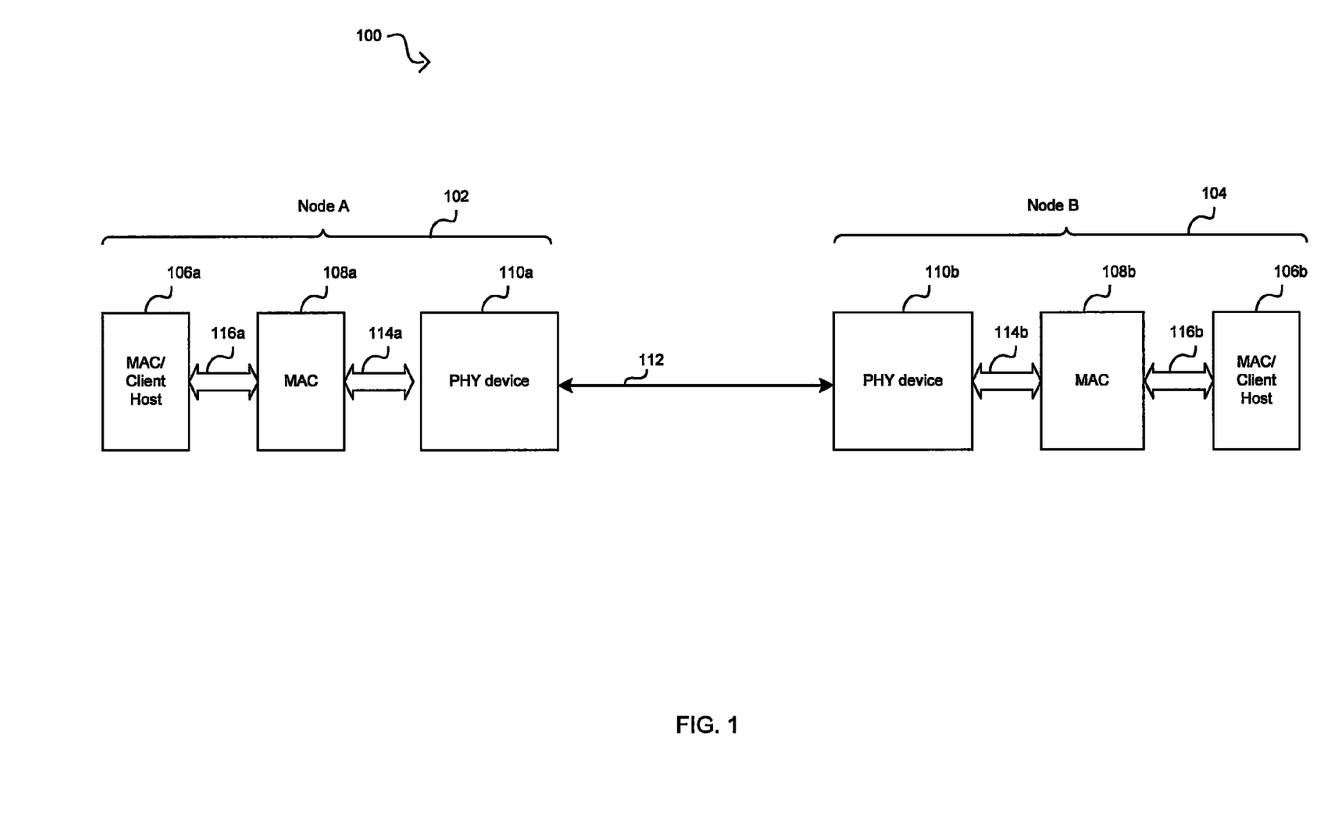
FIG. 1 is a block diagram illustrating an exemplary Ethernet connection enabled for an asymmetric handshake between two network nodes, in accordance with an embodiment of the invention.

FIG. 1 is a block diagram illustrating an exemplary Ethernet connection enabled for an asymmetric handshake between two network nodes, in accordance with an embodiment of the invention. Referring to FIG. 1, there is shown a system 100 that comprises a node A 102 and a node B 104. The node A 102 and the node B 104 may communicate via a cable 112. In an exemplary embodiment of the invention, the cable 112 may comprise up to four or more physical channels, each of which may, for example, comprise an unshielded twisted pair (UTP). The node A 102 and the node B 104 may communicate via two or more physical channels in the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In an exemplary embodiment of the invention, the link partners, node A 102 and node B 104, may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners, node A 102 and/or node B 104, may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the link partners, node A 102 and/or node B 104, may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The node A 102 may comprise a MAC client and/or host 106a, a medium access control controller (MAC) 108a, and a PHY device 104a. The node B 104 may comprise a MAC client and/or host 106b, a MAC 108b, and a PHY device 110b. Notwithstanding, the invention is not limited in this regard. In various embodiments of the invention, the node A 102 and/or node B 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the node A 102 and node B 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node A 102 and the node B 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates.

Moreover, the PHY devices 110a and 110b may support standard Ethernet link lengths or ranges of operation and/or extended ranges of operation. The PHY devices 110a and 110b may enable communication between the node A 102 and the node B 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable data to travel between node A 102 and node B 104 at symmetric data rates. For example, transmission and reception data rates may be the same in both directions between the link partners node A and node B even though link utilization within those data rates may be less than maximum. In other exemplary embodiments of the invention, data may travel at asymmetrical data rates even when both links partners operate at full utilization. In this regard, link capacity may be different in each direction. As such, a node may transmit at first data rate and receive at a second data rate. In this manner, an exemplary embodiment of the invention may comprise a multimedia server as node A 102 and may comprise a multimedia client as node B 104. The node A 102 may transmit multimedia data, for example, to the node B 104 at high(er) data rates while the node B 104 may transmit control or auxiliary data associated with the multimedia content at low(er) data rates. However, in either symmetrical or asymmetrical embodiments of the invention, node A 102 and node B 104 may comprise suitable logic, circuitry and/or code to enable asymmetric communication rates during a period of transitioning from a first data rate to a second data rate. The period of transitioning from a first data rate to a second data rate may comprise a change in data rate for data travelling in one or both directions. In this regard, each link partner, node A 102 and/or node B 104 may initiate and/or manage its own change in transmission data rate. Notwithstanding, one link partner may complete its own data rate transition regardless of a change in transmission data rate in the other link partner.

In various embodiments of the invention, a communication control policy for one or more of the link partners node A 102 and/or node B 104 may be enabled to conform data rates and/or link capacity to link 112 utilization needs. For example, the link partner 102, may utilize a byte of an Ethernet frame on which to transition a rate. In this regard, the link partner 102 may transition the rate just after transmitting the designated byte and the link partner 104 may transition just after receiving the designated byte. In this manner, data rate transitions on a link may occur in mid-frame. This technique may be very useful on serial type interfaces, such as, for example, a 10GBASE-KR or any of the optical interfaces. Also in accordance with an embodiment of the invention, the data rate may transition on an LDPC frame boundary. This may be useful for systems such as a 10GBASE-T PHY that splits an Ethernet packet into LDPC frames or any other PHY that splits packets into frames.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise MII, serial MII (SMII), reduced MII (RMII), gigabit MII (GMII), 10 gigabit MII (XGMII), serial gigabit MII (SGMII), reduced gigabit MII (RGMII) and serial 10 gigabit MII (SXGMII). In addition, ten attachment user interface (XAUI), an off chip interface may be utilized to connect between an XGMII on a MAC and XGMII on a 10GBASE-T PHY.

Figure 2A:
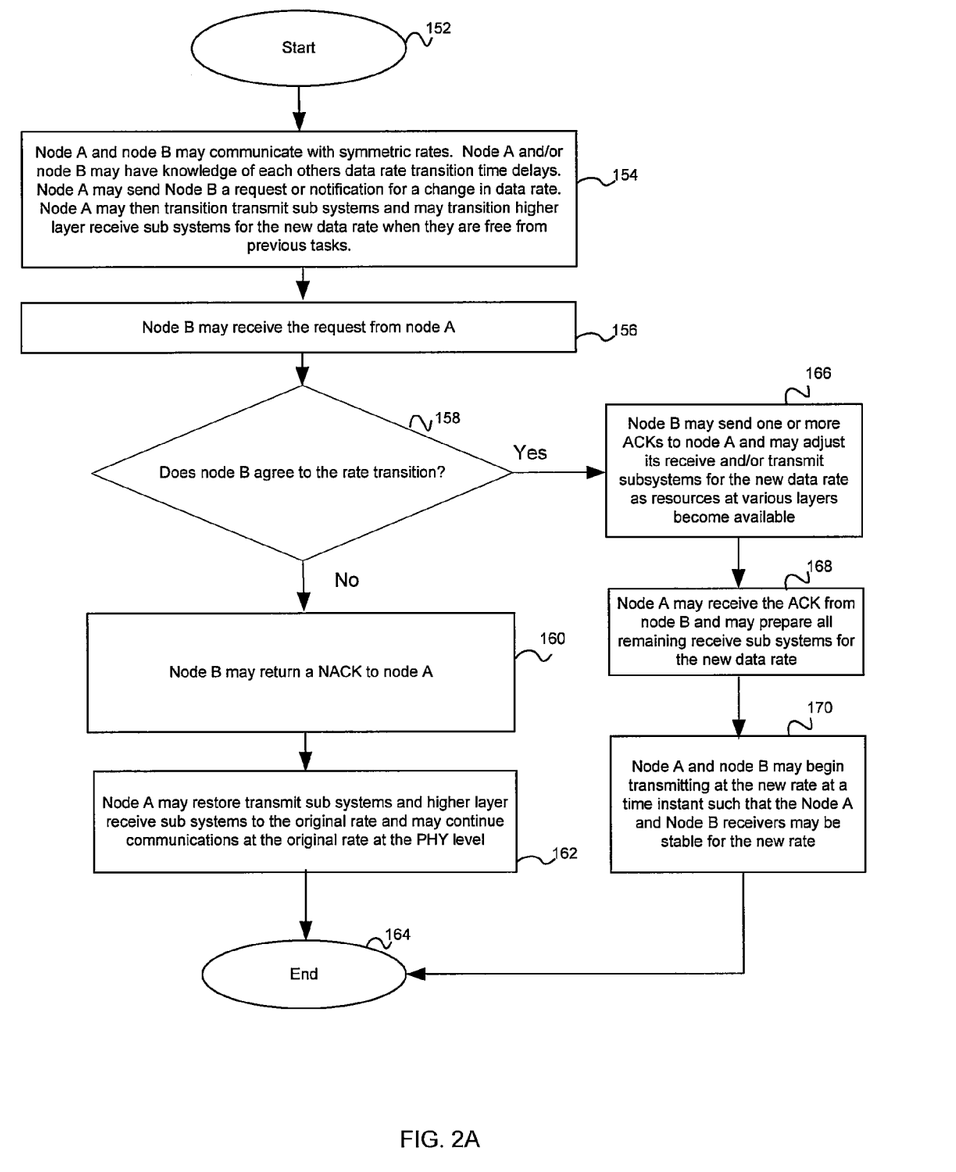
FIG. 2A is a flow chart illustrating exemplary steps for an asymmetric handshake in a system that may carry symmetric traffic during steady state, in accordance with an embodiment of the invention.
Figure 2B:
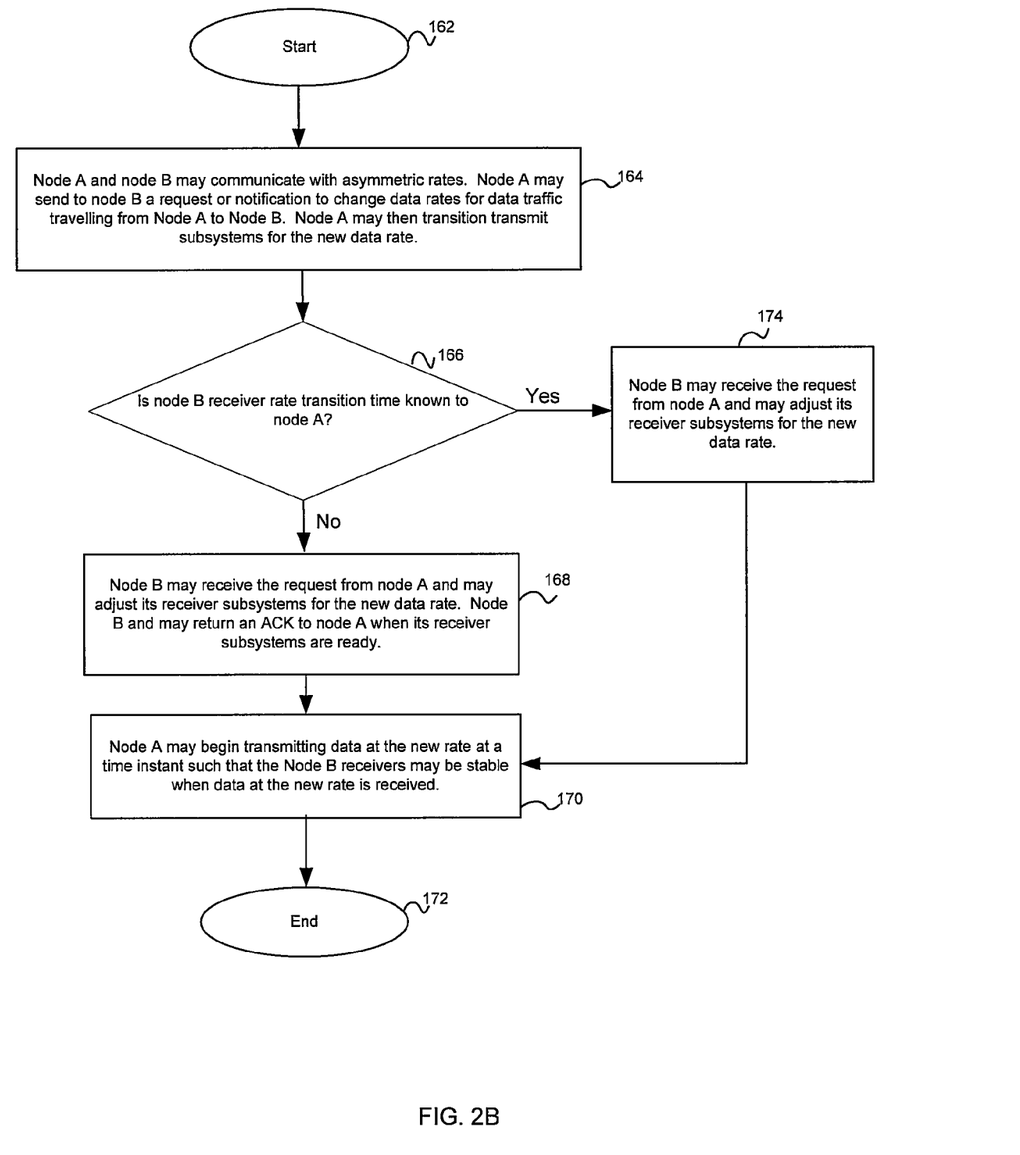
FIG. 2B is a flow chart illustrating exemplary steps for an asymmetric handshake in a system that may carry asymmetric traffic during steady state, in accordance with an embodiment of the invention.

In an exemplary embodiment of the invention illustrated in FIG. 2, the MAC clients and/or hosts 106*a* and 106*b* may represent layer 2 and above, the MACs 108*a* and 108*b* may represent layer 2 and above and the PHY devices 110*a* and 110*b* may represent the operability and/or functionality of layer 1 or the physical layer. In this regard, the PHY devices 110*a* and 110*b* may be referred to as physical layer transmitters and/or receivers, physical layer transceivers, PHY transceivers, PHYceivers, or PHY, for example. The MAC clients and/or hosts 106*a* and 106*b* may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MACs 108*a* and 108*b* may provide the necessary services to the MAC clients and/or hosts 106*a* and 106*b* to ensure that packets are suitably formatted and communicated to the PHY devices 110*a* and 110*b*. During transmission, each layer may add its own header to the data passed on from the interfacing layer above it. However, during reception, a compatible device having a similar OSI stack may strip off the headers as the message passes from the lower layers up to the higher layers.

The PHY devices 110*a* and 110*b* may be configured to handle physical layer requirements, which include, but are not limited to, packetization, data transfer and serialization/deserialization (SERDES), in instances where such an operation is required. Data packets received by the PHY devices 110*a* and 110*b* from MACs 108*a* and 108*b*, respectively, may include data and header information for each of the above six functional layers. The PHY devices 110*a* and 110*b* may be configured to encode data packets that are to be transmitted over the cable 112 and/or to decode data packets received from the cable 112. Various exemplary embodiments of the invention may enable the PHY devices 110*a* and/or 110*b* to utilize a reserved and/or out of band channel on the link 112 to exchange information for managing state changes such as transitioning from a first data rate to a second data rate. For example, in various embodiments of the invention, communications on the link 112 may adhere to 10GBASE-T standards wherein a reserved and/or out of band channel may comprise an auxiliary or reserved channel as described in clause 55 of the IEEE 802.3AN standard. In this regard an auxiliary bit may be pre-pended to blocks of data within an Ethernet frame. The auxiliary bit may be utilized for communicating data rate transition information within the 10GBASE-T network. Accordingly, a conventional 10GBASE-T network may transmit 800 Msymbols per second on each physical channel. A data rate of the auxiliary channel may be calculated as shown in EQ. 1.

Thus, the 10GBASE-T standard reserves an auxiliary channel of 3.125 Mbps. Accordingly, this auxiliary channel may be utilized for exchanging signals to manage data rate transition and/or state change information between Ethernet link node A 102 and node B 104. The auxiliary channel may be referred to as an out of band channel as well as a reserved channel. Accordingly, a reserved and/or out of band channel may be established during data rate transitions on the link. In this regard, when transitioning to a new data rate, the new data rate may comprise headroom for out of band signaling. Therefore, the new data rate may be higher than a rate necessary to support data traffic by an amount equal to or slightly greater then a rate needed to support the addition of reserved and/or out of band data.

Moreover, control characters that may be generated by a sub-layer within the physical layer, for example, the physical coding sub-layer (PCS) in a 10GBASE-T system, may be utilized to convey information for managing the data rate transitions. These control characters, also known as special symbols, may be transmitted during inter-packet gap (IPG), at packet boundaries or inserted within a packet. In addition, special symbols other than control characters, for example, special idles may be utilized. When symmetric and/or asymmetric systems utilize PHY layer signaling, control signals, such as a request for a change in data rate and/or an acknowledgement for a request, may be sent while data transmissions are in progress. This differs from legacy systems that utilize higher level packet signaling. In this regard, a link partner may have to queue control signals and wait to transmit them after in flight data traffic has finished. Utilizing PHY layer signaling may contribute to savings in time and energy.

Physical layer signaling such as control information sent via an auxiliary or out of band channel or via PCS control characters as well as higher layer protocol packets may be utilized for managing or requesting a plurality of state changes. For example, the state changes may comprise a transition from a zero data rate to an active channel data rate, from a first lower data rate to a second higher data rate, from a first higher data rate to a second lower data rate or from a first data rate to a zero data rate. Although, packets generated by higher layer protocols, for example, by a MAC client and/or host 106 and/or MAC 108 may be utilized for requesting data rate transitions, however, data rate transitions enabled via physical layer signaling may be accomplished within a shorter time duration.

The MAC 108*a* may comprise suitable logic, circuitry, and/or code that may enable handling of data link layer, layer 2, operability and/or functionality in the local link partner 102. Similarly, the MAC 108*b* may comprise suitable logic, circuitry, and/or code that may enable handling of layer 2 operability and/or functionality in the remote link partner 104. The MACs 108*a* and 108*b* may be configured to implement Ethernet protocols, such as those based on the IEEE 802.3 standard, for example. Notwithstanding, the invention is not limited in this regard.

The MAC 108*a* may communicate with the PHY device 110*a* via an interface 114*a* and with the MAC client and/or host 106*a* via a bus controller interface 116*a*. The MAC 108*b* may communicate with the PHY device 110*b* via an interface 114*b* and with the MAC client and/or host 106*b* via a bus controller interface 116*b*. The interfaces 114*a* and 114*b* correspond to Ethernet interfaces that comprise protocol and/or link management control signals. The interfaces 114*a* and 114*b* may be multi-rate capable interfaces and/or media independent interfaces (MII). The bus controller interfaces 116*a* and 116*b* may correspond to PCI or PCI-X interfaces. Notwithstanding, the invention is not limited in this regard.

$$\frac{1 \text{ auxiliary bit}}{256 \text{ symbols}} \cdot \frac{800 \text{ M symbols}}{\text{sec}} = \frac{3.125 \text{ M } aux \text{ bits}}{\text{sec}} \qquad \text{EQ. 1}$$

In operation, a data rate for data communicated via the link 112 may be controlled to communicate in a more energy efficient manner. For example, data rates may be lowered or reduced to zero on the link 112 which may enable reducing power consumed on the link 112 and in the link partners node A 102 and node B 104. The data rate may be controlled by, for example, controlling a number of physical channels utilized to communicate data, controlling the pulse amplitude modulation (PAM) levels used for signaling, controlling the signal constellation utilized for representing data on the link, and/or controlling the length of time between frames (the inter-frame gap). In this regard, one or more methods may be utilized on a link to achieve a maximum or full data rate, a zero data rate, or one or more intermediate data rates.

In an exemplary embodiment of the invention, one or more channels of the link 112 may transmit data in bursts in between periods of inactivity. In this regard, power may be reduced in comparison to a conventional network which may continuously transmit conventional IDLE symbols. For example, in various embodiments of the invention, traffic in one or both directions may be suspended or transitioned to a zero data rate. In this regard, a channel carrying a zero data rate may be referred to as a silent channel and channels may transition from being a silent channel to an active channel and visa versa. Transmitting data at a lower or zero rate may enable energy savings in the PHY 110a and/or 110b as well as within other components and or links of the system 100 such as the MAC 108a and/or 108b, the MAC client and/or host 106a and/or 106b and/or the link 112.

When the link partners node A 102 and node B 104 first start-up or upon establishing a connection, they may exchange some preliminary information and/or training signals via the PHY devices 110a and 110b. In this regard, the link partners node A 102 and node B 104 may negotiate a data rate (e.g., 1 Gbps or 10 Gbps) and simplex or duplex mode (e.g., full-duplex) for communicating with each other. Additionally, in order to establish reliable communications, each of the link partners node A 102 and node B 104 may need to account for variables such as the type of cabling over which data is being communicated and the environmental conditions (e.g. temperature) surrounding the cabling. Accordingly, "training" link partners node A 102 and/or node B 104 may adapt a link partner to current link conditions such that reliable and energy efficient communications may be established on a link. For example, training may comprise configuring various parameters, circuitry, and or timing loops in one or both of the nodes A 102 and B 104 such that the nodes may be synchronized and/or reliably communicate over one or more physical channels of the cable 112. In this manner, training may ensure reliable and energy efficient operation of functions such as echo cancellation, far-end crosstalk cancellation, and near-end crosstalk cancellation may be performed.

In energy efficient networks, a communication control policy may be defined for controlling transitions in data rates between two link partners, for example, node A 102 and node B 104. Steady state data rates and/or link capacity may be symmetric and/or asymmetric. Data rates may be adjusted based on, for example, network utilization as well as on future network demand and/or expected link utilization according to the communication control policy. Each link partner, node A 102 and/or node B 104 may have its own control policy. The control policy may determine which type of communication signaling may be utilized for data rate transitions. For example, one or more of a plurality of physical layer methods and/or on higher level packet methods may be utilized. In this regard, PHY layer out of band (OOB) signaling, PCS control characters, special symbols, patterns and/or other physical layer signaling techniques may be utilized for various signaling between the link partners. In addition, the control policy may determine handshaking methods for data rate transitions based on whether a system in a steady state utilizes symmetric or asymmetric data rates.

In various embodiments of the invention, energy savings may be realized relative to legacy Ethernet technology, by utilizing asymmetric handshakes for implementing data rate transitions. Asymmetric handshakes may be utilized in systems that communicate with symmetric and/or asymmetric steady state data rates. Asymmetric handshakes may enable link partners to utilize knowledge about how much time may be needed for a PHY 110 and/or higher layer resources 106 and/or 108, to transition to a new data rate. For example, a control policy for the local node A 102 may comprise information about data rate transition times for itself and/or its link partner 104 B. In this manner, the PHY 110 and/or the higher layer resources 108 and/or 106, may be shut down early and/or transitioned to a different data rate as soon as they are free from other tasks, without waiting for a closed loop handshaking cycle to end as in legacy Ethernet systems.

Transition times may vary for different rate transitions and for different resources. For example, a control policy for node A 102 may comprise a table of rate transition times for the link partner node B 104. The node B 104 transition times may take into account the time to send a rate change request to the link partner node B 104 and time for the link partner node B 104 to resynchronize for the new data rate. In some embodiments of the invention, the node A 102 may not wait for node B 104's acknowledgement and may begin transitioning its resources according to the rate transition times table from its control policy. In this regard, the rate transition times table may comprise times for transitioning from each possible first rate to each possible second rate. See Table 1 for an exemplary table of rate transition times for transitioning between zero rate, half rate and/or full rate communication. In this manner, significant time and energy may be saved compared to legacy systems that rely on closed loop packet messages originated from layers above the PHY 110.

In various exemplary embodiments of the invention, PHY layer signaling may enable resources in higher layers, such as the MAC 108a and/or 108b and/or MAC/client host 106a and/or 106b, to be released as each of their tasks are finished. The higher layer resources may transition to the new data rate before the PHY 110a and/or 110b layer completes its signaling. The PHY layer may then transition rates when its tasks are complete. Releasing resources by layer and/or lowering data rates early may save significant energy and/or time. Once an asymmetric handshake is complete, a symmetric system may resume symmetric data rates and/or an asymmetric system may operate with asymmetric data rates.

TABLE 1

Data Rate Transition Times

| | To | | |
|---|---|---|---|
| From | Zero Rate (0) | Half Rate (1) | Full Rate (2) |
| Zero Rate (0) | NA | $T_{01}$ | $T_{02}$ |
| Half Rate (1) | $T_{10}$ | NA | $T_{12}$ |
| Full Rate (2) | $T_{20}$ | $T_{21}$ | NA |

Various exemplary embodiments of the invention may comprise a symmetric system. In symmetric systems, when one side, for example, node A 102, requests a data rate change, the other side, node B 104, may respond by acknowledging one or more conditions. For example, the node B 104 may acknowledge that it is willing to change data rate, it may acknowledge that its receiver subsystems (PHY and/or higher levels) are ready to transition to the new rate and/or that its transmitter subsystems (PHY and/or higher levels) are ready to transition. The one or more acknowledgments may be sent at different times via a plurality of ACK and/or NACK messages or may be combined into one ACK and/or NACK message. Savings in energy consumption may be achieved by transitioning more quickly to lower or zero data rates.

In various exemplary embodiments of the invention, in instances when the node A 102 may request a data rate change, the node B 104 may acknowledge when its receiver subsystems (PHY and/or higher levels) are ready to receive at a new data rate. In this manner, the node B 104 may modify various receiver circuitry and/or functionality such as noise cancellation, pre-emphasis or other functionality that may enable reception when a communication environment is modified. Alternatively, in various instances the initiating link partner, such as node A 102, may know the time needed for its link partner node B 104 to receive a request and to prepare its receiver subsystems for reception at a new data rate. In this regard, the node A 102 may request a data rate change and may prepare its higher layer MAC 108a and/or MAC/client host 106 for the new rate. It may also delay data transmission at the new data rate according to the time needed for node B 104 to prepare its receiver subsystems. The node A 102 may then begin transmitting at the new data rate without receiving an ACK from the node B 104. The node B may respond via the PHY layer 110 with a NACK if it may not accept the rate change. In instances when the node A 102 receives a NACK, it may then reinstate the MAC 108a and/or MAC/client host 106a resources at the previous rate.

Thus, even in symmetric data rate systems, data rate transitions may be coordinated for each direction of data traffic asymmetrically. For example, a data rate change may be implemented in one direction prior to implementation of a corresponding data rate change in the opposite direction. In some embodiments of the invention, node A 102 and/or node B 104 may coordinate their own transmission data rate transitions independently. Accordingly, aspects of the invention may enable utilizing an asymmetric handshake such that a first node, for example, node A 102 may transition to a different data rate while a second node, node B 104 for example, empties its buffers in preparation to make a corresponding data rate transition. In this regard, the node A 102 may transmit a request for a data rate change to node B 104 utilizing one or more of a plurality of physical layer methods. For example, PHY layer out of band signaling, PCS control characters, special symbols, patterns and/or other physical layer signaling techniques may be utilized.

Subsequently, the node B 104 may receive the request and may respond or acknowledge (ACK) the request utilizing a physical layer event, for example, a distinct IDLE symbol while finishing up transmissions that were already in progress when the request was received. The node B 104 may ready its receivers for the data rate transition even though it may have transmit data in flight or have buffered data waiting to be transmitted to node A 102. In this manner, the node A 102 may receive the acknowledgment and may determine a time instant for beginning to transmit at the new data rate (or turn down transmitters for a zero data rate) based on knowledge of how long it takes for node B 104 to transition and stabilize receivers for the new data rate. In this regard, node A 102 may begin transmitting at the new data rate without having to wait for the node B 104 transmitters to complete transmissions already in progress and/or queued.

Various exemplary embodiments of the invention may utilize asymmetric communication systems. In this regard, the node A 102 may request that the node B 104 receive data at a new data rate. The node B 104 may respond with an ACK message when its receiver subsystem is prepared to receive data at the new rate. For example, the node B 104 may adjust receiver circuitry and/or functionality such as noise cancellation, pre-emphasis or functionality that may enable reception after the communication environment is modified by a change in data rate. Alternatively, a need for acknowledgment from node B 104 may be eliminated. For example, in instances when both sides, node A 102 A and node B 104 may be aware of the control policy, node A 102 may know a delay time needed for node B 104 to prepare its receiver subsystems for the new data rate. In this regard, node A 102 may initiate the data rate change without receiving an ACK from the node B 104. In instances when the node B 104 rejects the rate change, it may send a NACK to node A 102 and node A 102 may modify its transmission subsystems. In this manner, time and energy may be conserved due to quicker handshake time and earlier times for lowering power to various PHY 110, MAC 108 and/or MAC/client host 106 resources.

FIG. 2A is a flow chart illustrating exemplary steps for an asymmetric handshake in a system that may carry symmetric traffic during steady state, in accordance with an embodiment of the invention. Referring to FIG. 2A, after start step 152, in step 154, node A and node B may communicate with symmetric rates. Node A and/or node B may have knowledge of each others data rate transition time delays. Node A may send Node B a request or notification for a change in data rate. Node A may then transition transmit subsystems and may transition higher layer receive subsystems for the new data rate when they are free from previous tasks. In step 156, node B 104 may receive the request from node A 102. In step 158, if node B 104 agrees to the rate transition, proceed to step 160.

In step 160, Node B 104 may return a NACK to node A 102. In step 162, node A 102 may restore transmit subsystems 110a, 108a and/or 106a and/or higher layer receive subsystems 108a and 106a to their original rate and may continue communications at the original rate at the PHY 110a level. Step 164 may be an end of the exemplary steps. In step 158, if node B 104 does agree to the rate transition, proceed to step 166. In step 166, node B 104 may send one or more ACKs to node A 102 and may adjust its receive and/or transmit subsystems for the new data rate as resources at various layers 110b, 108b and/or 106b become available. In step 168, node A 102 may receive the ACK from node B 104 and may prepare remaining receive subsystems for the new data rate. In step 170, node A 102 and node B 104 may begin transmitting at the new rate at a time instant such that the node A 102 and node B 104 receivers may be stable for the new rate.

FIG. 2B is a flow chart illustrating exemplary steps for an asymmetric handshake in a system that may carry asymmetric traffic during steady state, in accordance with an embodiment of the invention. Referring to FIG. 2B, after start step 162, in step 164, node A 102 and node B 104 may communicate with asymmetric rates. Node A 102 may send to node B 104 a request or notification to change data rates for data traffic travelling from Node A 102 to Node B 104. Node A 102 may then transition transmit subsystems for the new data rate. In step 166, if node B 104 receiver rate transition time is not known to node A 102, proceed to step 168. In step 168, node B 104 may receive the request from node A 102 and may adjust its receiver subsystems for the new data rate. Node B 104 and may return an ACK to node A 102 when its receiver subsystems are ready.

In step 170, node A 102 may begin transmitting data at the new rate at a time instant such that the Node B 104 receivers may be stable when data at the new rate is received. Step 172 may be an end of the exemplary steps. In step 166, if node B 104 receiver rate transition time may be known to node A 102, the exemplary steps proceed to step 174. In step 174, node B 104 may receive the request from node A 102 and may adjust its receiver subsystems for the new data rate.

Figure 3A:
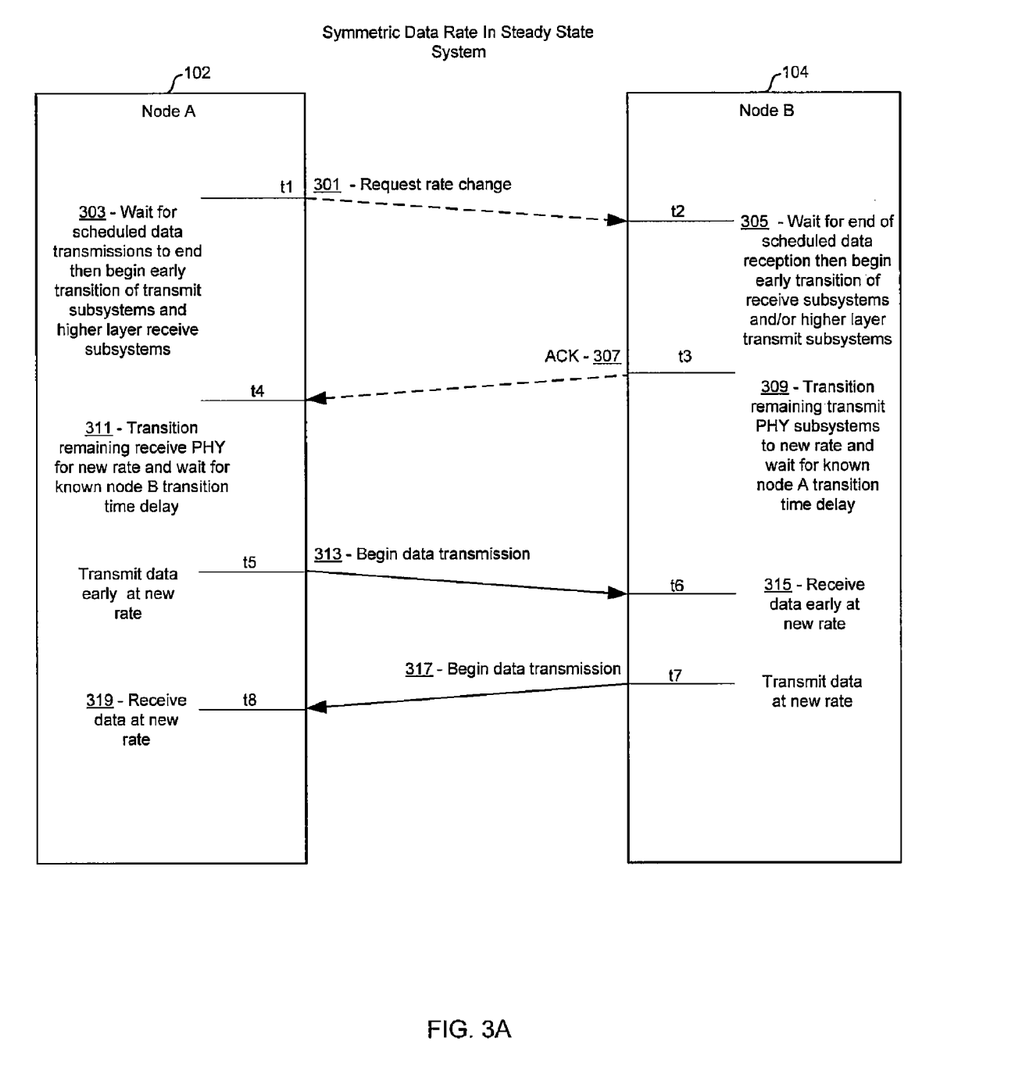
FIG. 3A is a data flow diagram illustrating an exemplary method for an asymmetric handshake in a system that may carry symmetric traffic during steady state, in accordance with an embodiment of the invention.

FIG. 3A is a data flow diagram illustrating an exemplary method for an symmetric handshake in a system that may carry symmetric traffic during steady state, in accordance with an embodiment of the invention. Referring to FIG. 3A there is shown the link partners node A 102 and node B 104. Data rates between node A 102 and node B 104 may be symmetric during steady state traffic flow. Control traffic may comprise physical layer signaling and/or higher layer packet traffic between node A 102 and node B 104. Control traffic may be represented by a broken line. Steady state data traffic may be represented by a solid line.

In step 301, at time t1, node A 102 may issue a request for a rate change. In step 303, node A 102 may wait for scheduled data transmissions to end and/or may begin early transition of transmit subsystems and higher layer receive sub systems. In step 305, at time t2, node B 104 may receive the request from node A 102. Node B 104 may wait for end of scheduled data reception then begin early transition of receive subsystems and/or higher layer transmit subsystems as they become available. In step 307, the node B 104 may transmit an acknowledgement (ACK) to the node A 102. In step 309, the node B 104 may transition remaining transmit PHY subsystems to the new rate and wait for a known node A transition time delay before transmitting data at a new rate.

In step 311, node A 102 may receive the ACK from node B 104 and may transition any remaining receive PHY to new rate and wait for known node B transition time delay. In step 313, at time t5, node A 102 may transmit data early at the new rate. In step 315, at time t6, node B 104 may receive the data at the new rate. In step 317, at time t7, node B 104 may begin transmitting data at the new rate. In step 318, at time t8, node A 102 may receive data at the new rate. In this regard the new rate may be a lower or zero rate utilizing low(er) power. The early transitioning of transmit and/or receive subsystems may contribute to energy savings.

Figure 3B:
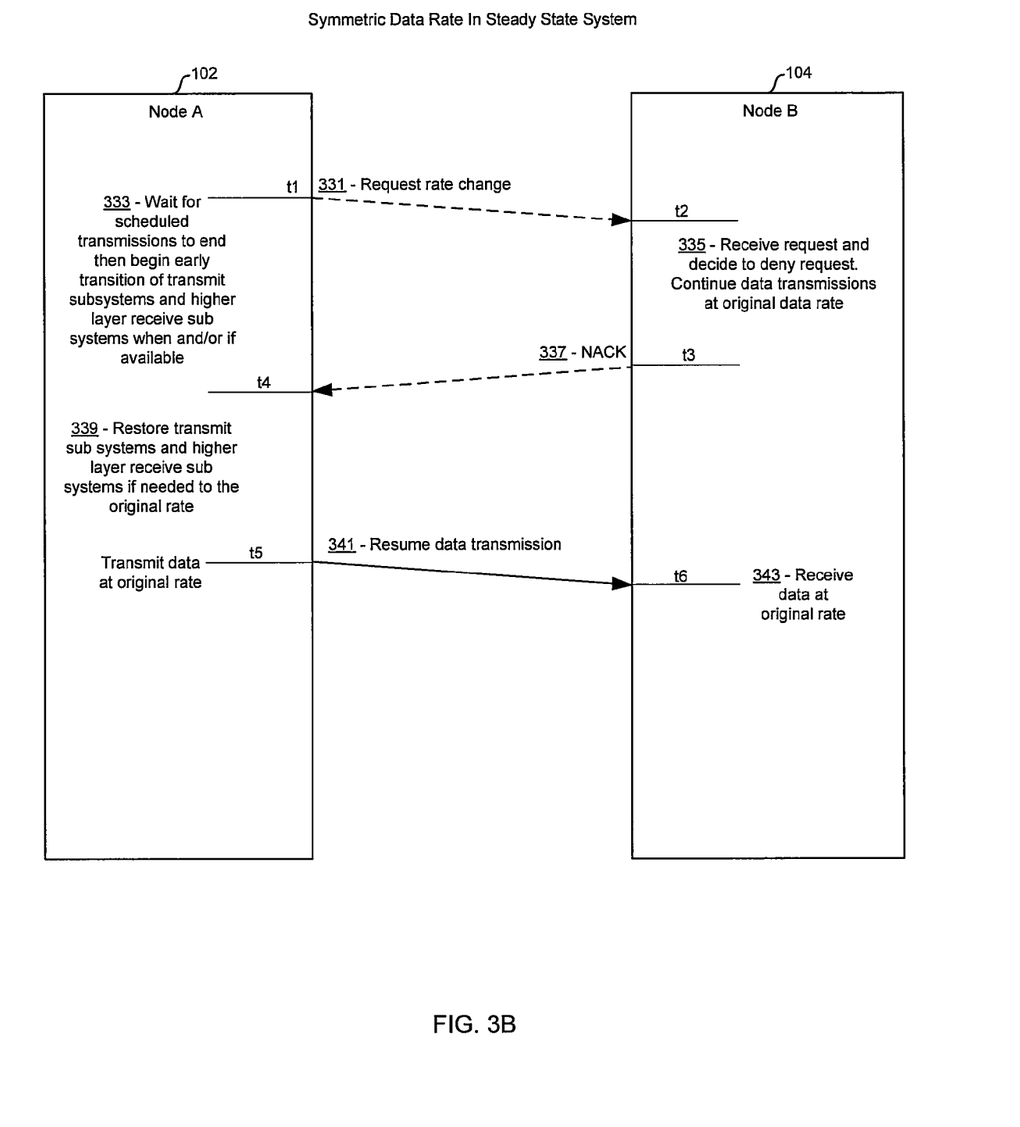
FIG. 3B is a data flow diagram illustrating an exemplary method for an asymmetric handshake in a system that may carry symmetric traffic during steady state, in accordance with an embodiment of the invention.

FIG. 3B is a data flow diagram illustrating an exemplary method for an asymmetric handshake in a system that may carry symmetric traffic during steady state, in accordance with an embodiment of the invention. Referring to FIG. 3B there is shown the link partners node A 102 and node B 104. Data rates between node A 102 and node B 104 may be symmetric during steady state traffic flow. Control traffic may comprise physical layer signaling and/or higher layer packet traffic between node A 102 and node B 104. Control traffic may be represented by a broken line. Steady state data traffic may be represented by a solid line.

In step 331, at time t1, node A 102 may issue a request for a rate change. In step 333, node A 102 may wait for scheduled transmissions to end and may then begin an early transition of transmit subsystems and higher layer receive sub systems when and/or if they become available. In step 335, at time t2, node B 104 may receive the request from node A 102 and may decide to deny the request. Node B 104 may continue data transmissions at original data rate. In step 337, the node B 104 may transmit a NACK to the node A 102. In step 339, the node A 102 may receive the NACK from node B 104 and may restore its transmit subsystems and higher layer receive subsystems where needed, to the original rate. In step 341, at time t5, node A 102 may resume transmitting at a data rate utilized prior to t1. In step 343, at time t6, node B 104 may receive data at the original data rate.

Figure 3C:
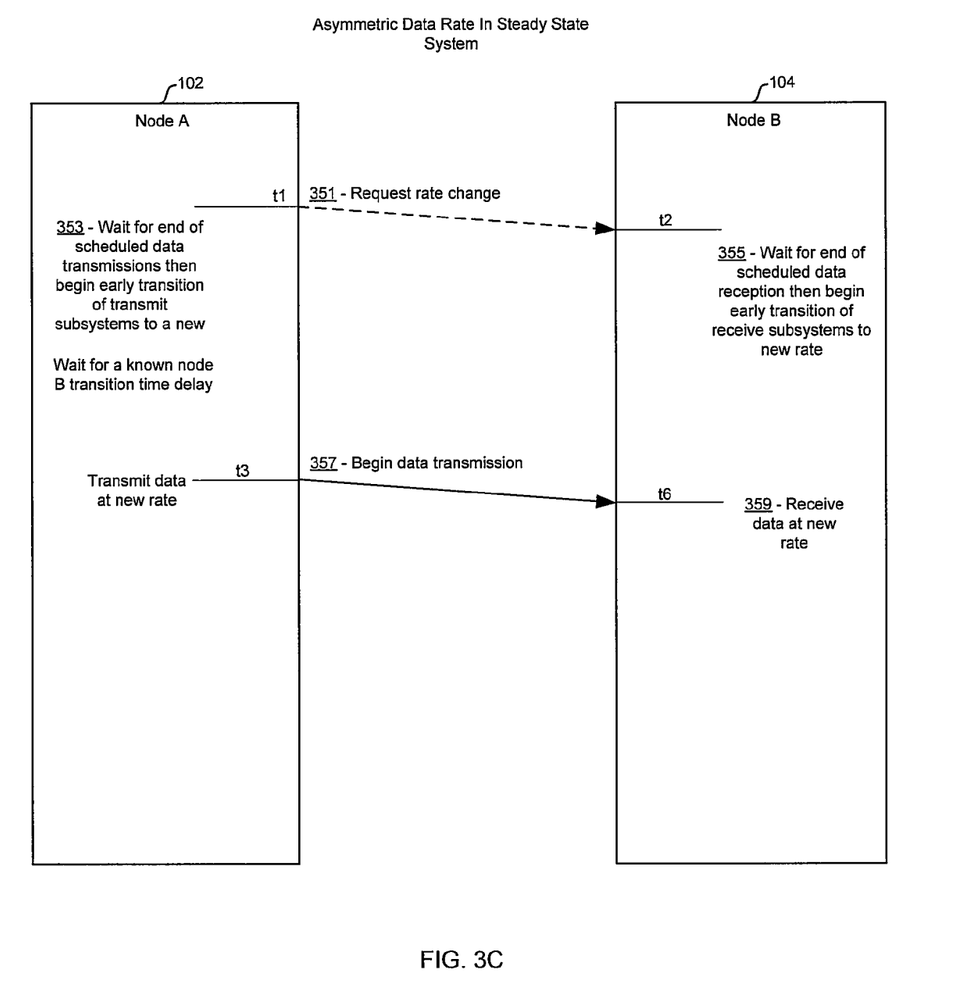
FIG. 3C is a data flow diagram illustrating an exemplary method for an asymmetric handshake in a system that may carry asymmetric traffic during steady state, in accordance with an embodiment of the invention.

FIG. 3C is a data flow diagram illustrating an exemplary method for an asymmetric handshake in a system that may carry asymmetric traffic during steady state, in accordance with an embodiment of the invention. Referring to FIG. 3C there is shown the link partners node A 102 and node B 104. Data rates between node A 102 and node B 104 may be asymmetric during steady state traffic flow. Control traffic may comprise physical layer signaling and/or higher layer packet traffic between node A 102 and node B 104. Control traffic is represented by a broken line. Steady state data traffic may be represented by a solid line.

In step 351, at time t1, node A 102 may issue a request for a rate change. In step 353, node A 102 may wait for an end of scheduled data transmissions if necessary and may then begin early transition of transmit subsystems to a new rate. In addition, node A 102 may wait for a known node B transition time delay. In step 355, at time t2, node B 104 may receive the request from node A 102. If necessary, node B 104 may wait for an end of scheduled data reception and then may begin an early transition of receive subsystems to the new rate. In step 357, at time t3, node A 102 may begin early transmission of data at the new data rate. In step 359, at time t6, node B 104 may receive data at the new data rate. In this regard the new rate may be a zero rate and/or low power or silent state on transmit subsystems for link partner 102 A and receive subsystems on link partner 104 B. The early transitioning of transmit and/or receive subsystems may contribute to energy savings.

In an embodiment of the invention, an Ethernet network 100 may comprise multi-rate link partners 110a and 110b that may be coupled via an Ethernet link 112. A first multi-rate link partner 102 may be configured to implement a change of data rate for data communicated from the first multi-rate link partner 102 to a second multi-rate link partner 104 coupled via the Ethernet link 112. The configuration of the first multi-rate link partner 102 may be accomplished independent of any delay that may occur when the second multi-rate link partner 104 may implement a change of data rate for data communicated from the second multi-rate link partner 104 to the first multi-rate link partner 102.

In addition, a time instant for implementing changes of data rates in the link partner 102 for example, may be determined based on known time delays for configuring the second multi-rate link partner 104 to implement the data rate change. The change in data rate for data transmitted from the first link partner 102 to the second link partner 104 may not be delayed by transmissions generated by the second link partner 104. Data rate changes may be managed via one or more of physical layer control characters, physical layer out of band channel and packets generated from a layer above the physical layer. In instances where physical layer control characters are utilized, the control characters may be transmitted during inter-packet gaps and/or within a packet stream. However, utilizing physical layer control characters and/or out of band channel may be faster than utilizing packets generated from higher a layer protocol.

In some embodiments of the invention, the first link partner 102 and the second link partner 104 may transmit data symmetrically, for example, they may exchange data at the same data rate in both directions, before and/or after implementation of a change in data rate. In other embodiments of the invention, the first link partner 102 and the second link partner 104 may transmit data asymmetrically, for example, they may transmit data at different data rates, after and/or before implementation of the change in data rate. Accordingly, data rates for one or both link partners 102 and/or 104 may be transitioned from one or more of a full data rate, an intermediate data rate and a data rate of zero to one or more of a full data rate, an intermediate data rate and a data rate of zero. In this manner, by adjusting data rates within a quicker transition time, Ethernet networks may be enabled to communicate in a more energy efficient manner.

An embodiment of the invention comprises a method for communication, the method comprising: in an Ethernet network comprising multi-rate link partners coupled via an Ethernet link, configuring a first of said multi-rate link partners to implement a change of data rate for communication of data from said first multi-rate link partner to a second of said multi-rate link partners, wherein said implemented change occurs independently of delays that occur when said second of said multi-rate link partners implements a change of data rate for communication of data from said second of said multi-rate link partners to said first of said multi-rate link partners. The embodiment also comprises the method above wherein change of said data rate is managed via physical layer control characters, physical layer out of band channel and/or packets generated from above the physical layer. The embodiment also comprises the method above wherein said change of data rate physical layer control characters, are transmitted during one or more inter-packet gaps, within a packet stream.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for asymmetric data rate transition handshake in an energy efficient Ethernet network.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an Ethernet network comprising multi-rate link partners coupled via an Ethernet link:
notifying, by a first of said multi-rate link partners, a second of said multi-rate link partners of a change of data rate in both directions on said Ethernet link; and
configuring said first of said multi-rate link partners to implement said change of data rate for communication of data from said first multi-rate link partner to said second of said multi-rate link partners by controlling one or both of pulse amplitude modulation levels and signal constellation, wherein said implemented change occurs independently of delays that occur when, as a result of said notification, said second of said multi-rate link partners implements said change of data rate for communication of data from said second of said multi-rate link partners to said first of said multi-rate link partners;
wherein said notification comprises a bit pre-pended to each of a plurality of Ethernet frames.

2. The method according to claim 1, wherein said change of data rate for said communication of data from said first multi-rate link partner to said second of said multi-rate link partners is implemented at a time instant that is determined based on known time delays relating to configuration of said second of said multi-rate link partners for reception of data at said changed data rate.

3. The method according to claim 1, wherein for said implementation of said change of data rate in both directions, said change of data rate for said communication of data from said first said multi-rate link partner to said second of said multi-rate link partners is undelayed by data transmissions generated by said second of said multi-rate link partners.

4. The method according to claim 1, wherein said change of said data rate is managed via physical layer control characters, physical layer out of band channel and/or packets generated from above the physical layer.

5. The method according to claim 4, wherein said change of data rate physical layer control characters are transmitted during inter packet gap (IPG), at packet boundaries or inserted within a packet.

6. The method according to claim 1, wherein said first of said multi-rate link partners and said second of said multi-rate link partners transmits data traffic at a same data rate prior to and subsequent to said implementation of said change of said data rate.

7. The method according to claim 1, wherein said first of said multi-rate link partners and said second of said multi-rate link partners transmits data traffic at different data rates prior to and subsequent to said implementation of said change of said data rate.

8. The method according to claim 1, comprising changing said data rate from a prior data rate to a full data rate, an intermediate data rate and/or a data rate of zero, wherein said prior data rate comprises one of said full data rate, an intermediate data rate and said data rate of zero.

9. A machine-readable storage having stored thereon, a computer program having at least one code section for communication, the at least one code section being executable by a machine for causing the machine to perform steps comprising:
in an Ethernet network comprising multi-rate link partners coupled via an Ethernet link:

notifying, by a first of said multi-rate link partners, a second of said multi-rate link partners of a change of data rate in both directions on said Ethernet link; and configuring said first of said multi-rate link partners to implement said change of data rate for communication of data from said first multi-rate link partner to said second of said multi-rate link partners by controlling one or both of pulse amplitude modulation levels and signal constellation, wherein said implemented change occurs independently of delays that occur when, as a result of said notification, said second of said multi-rate link partners implements said change of data rate for communication of data from said second of said multi-rate link partners to said first of said multi-rate link partners;

wherein said notification comprises a bit pre-pended to each of a plurality of Ethernet frames.

10. The machine-readable storage according to claim 9, wherein said change of data rate for data communicated from said first multi-rate link partner to said second of said multi-rate link partners is implemented at a time instant that is determined based on known time delays relating to configuration of said second of said multi-rate link partners to implement said change of data rate.

11. The machine-readable storage according to claim 9, wherein said implementation of said change of data rate in both directions, said change of data rate for said communication of data from said first said multi-rate link partner to said second of said multi-rate link partners is undelayed by data transmissions generated by said second of said multi-rate link partners.

12. The machine-readable storage according to claim 9, wherein said change of said data rate is managed via physical layer control characters, physical layer out of hand channel and/or packets generated from above the physical layer.

13. The machine-readable storage according to claim 12, wherein said change of data rate physical layer control characters are transmitted during inter packet gap (IPG), at packet boundaries or inserted within a packet.

14. The machine-readable storage according to claim 9, wherein said first of said multi-rate link partners and said second of said multi-rate link partners transmits data traffic at a same data rate prior to and subsequent to said implementation of said change of data rate.

15. The machine-readable storage according to claim 9, wherein said first of said multi-rate link partners and said second of said multi-rate link partners transmits data traffic at different data rates prior to and subsequent to said implementation of said change of said data rate.

16. The machine-readable storage according to claim 9, wherein said at least one code section comprises code that enables changing said data rate from a prior data rate to a full data rate, an intermediate data rate and/or a data rate of zero, wherein said prior data rate comprises one of said full data rate, an intermediate data rate and said data rate of zero.

17. A system for communication, the system comprising:
one or more circuits in a first multi-rate link partner wherein said first multi-rate link partner is coupled via an Ethernet link in an Ethernet network to a second multi-rate link partner, wherein said one or more circuits are operable to:

notify, by said first of said multi-rate link partners, said second of said multi-rate link partners of a change of data rate in both directions on said Ethernet link; and configure said first of said multi-rate link partners to implement said change of data rate for communication of data from said first multi-rate link partner to said second of said multi-rate link partners by controlling one or both of pulse amplitude modulation levels and signal constellation, wherein said implemented change occurs independently of delays that occur when, as a result of said notification, said second of said multi-rate link partners implements said change of data rate for communication of data from said second of said multi-rate link partners to said first of said multi-rate link partners;

wherein said notification comprises a bit pre-pended to each of a plurality of Ethernet frames.

18. The system according to claim 17, wherein said change of data rate for data communicated from said first multi-rate link partner to said second of said multi-rate link partners is implemented at a time instant that is determined based on known time delays relating to configuration of said second of said multi-rate link partners to implement said change of data rate.

19. The system according to claim 17, wherein for said implementation of said change of data rate in both directions, said change of data rate for said communication of data from said first said multi-rate link partner to said second of said multi-rate link partners is undelayed by data transmissions generated by said second of said multi-rate link partners.

20. The system according to claim 17, wherein said change of said data rate is managed via physical layer control characters, physical layer out of band channel and/or packets generated from above the physical layer.

21. The system according to claim 20, wherein said change of data rate physical layer control characters are transmitted during inter packet gap (IPG), at packet boundaries or inserted within a packet.

22. The system according to claim 17, wherein said first of said multi-rate link partners and said second of said multi-rate link partners transmits data traffic at a same data rate prior to and subsequent to said implementing change of data rate.

23. The system according to claim 17, wherein said first of said multi-rate link partners and said second of said multi-rate link partners transmits data traffic at different data rates prior to and subsequent to said implementation of said change of said data rate.

24. The system according to claim 17, wherein said one or more circuits enable comprising changing said data rate from a prior data rate to a full data rate, an intermediate data rate and/or a data rate of zero, wherein said prior data rate comprises one of said full data rate, an intermediate data rate and said data rate of zero.

* * * * *